UNITED STATES PATENT OFFICE.

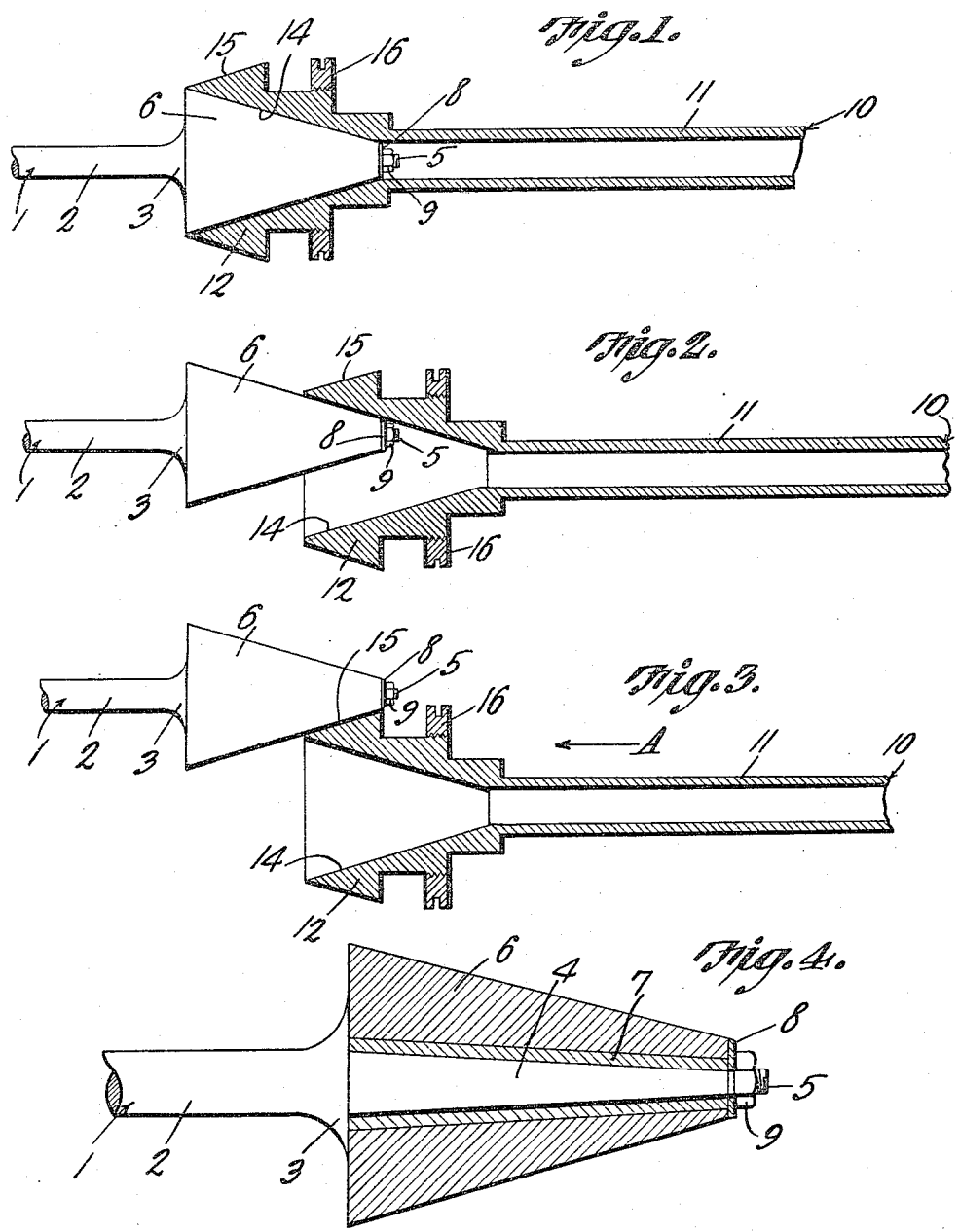

ORDIA R. LEAMING, OF NORTH YAKIMA, WASHINGTON.

GEARLESS TRANSMISSION.

1,182,778. Specification of Letters Patent. Patented May 9, 1916.

Application filed March 24, 1915. Serial No. 16,724.

*To all whom it may concern:*

Be it known that I, ORDIA R. LEAMING, a citizen of the United States, residing at North Yakima, in the county of Yakima and State of Washington, have invented a new and useful Gearless Transmission, of which the following is a specification.

The device forming the subject matter of this application is a transmission adapted to be employed upon automobiles and generally in machines where it is desired to impart rotation to a driven member from a driving member.

The invention aims to provide a simple means whereby without the use of gears and like elements, various speeds of rotation may be produced both in a forward direction and in a reverse direction.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in longitudinal section, the parts being in the positions which they will assume when the device is working full speed ahead; Fig. 2 is a longitudinal section, parts being in the positions which they will assume when the structure is working at a reduced speed ahead; Fig. 3 is a longitudinal section, the parts being in the positions which they will assume when the structure is working at a reduced speed in a reverse direction; Fig. 4 is a fragmental longitudinal section of the main or driving member.

In carrying out the present invention there is provided a main member denoted by the numeral 1 and including a shaft 2 which may be taken to represent the shaft of an engine. The shaft 2 is provided with an abutment 3 and beyond the abutment 3 the shaft is formed into a reduced, tapered tip 4 which is threaded at its end as shown at 5. A tapered, conical head 6 constitutes a part of the main driving member 1 and abuts against the shoulder 3, the head 6 being provided with a bushing 7. A washer 8 engages the smaller end of the head 6 and is held in place by means of a nut 9 mounted on the threaded end 5 of the stem 4. The head 6 preferably is fashioned from paper, fiber or the like.

The invention comprises an auxiliary or driven member denoted by the numeral 10 and including a tubular shaft 11 terminated in a socket 12 the bore of which is tapered and of conical form as shown at 14. The head 12 comprises an external track 15 which is tapered in a direction opposite to the taper of the socket 14. Threaded or otherwise secured onto the head 12 is shift collar 16.

When the head 6 is inserted full length into the socket 14, as shown in Fig. 1, the parts 1 and 10 are connected for rotation at the highest speed in a forward direction. By retracting the driving member 1, or, more correctly speaking by retracting the driven member 10, as shown in Fig. 2, the head 6 is given a tangential contact with the wall of the socket 14, and since the head 6 is partially withdrawn, from the socket 14, the effective diameter of the head is reduced, so far as is concerned the imparting of a rotary movement to the member 10. The parts, when arranged as shown in Fig. 2, thereby disclose the device as it will appear when working on a reduced speed in a forward direction. The driven member 10 may be retracted and then be advanced, having been moved laterally, until the head 6 of the driving member 1 coacts with the track 15. If the smaller end of the head 6 coacts with the track 15 as shown in Fig. 3, then the parts are connected for a low speed drive in a reverse direction. Obviously, by advancing the member 10 in the direction of the arrow A in Fig. 3, the speed of rotation in a reverse direction may be increased.

The head 6 does not coact with the socket 14 like the correspondingly shaped parts of a cone clutch, but rather as two friction wheels coact with each other in a friction drive, comprising wheels of the sort above alluded to.

Having thus described the invention, what is claimed is:—

In a device of the class described, a rotatable main member including a tapered head; and a rotatable auxiliary member including a tapered socket in which the head is received to connect the members for rotation in one direction, the auxiliary member being provided with forward, intermediate and rear, external stepped ribs acting as reinforcements for the auxiliary member and integral therewith, the outer surface of the forward rib being tapered in a direction opposite to the taper of the socket and being adapted to receive the head, thereby to connect the main and auxiliary members for simultaneous rotation in an opposite direction; and a grooved ring surrounding the intermediate rib, the periphery of the ring being located within the contour of a cone formed by prolonging the outer surface of the rib.

In testimony that I claim the foregoing as my own, I have hereto affixed my signature in the presence of two witnesses.

ORDIA R. LEAMING.

Witnesses:
RAYMOND H. ERKENBRACK,
WESLEY BOYD.

Copies of this patent may be obtained for five cents each, by addressing the "Commissioner of Patents, Washington, D. C."